US009602868B2

(12) United States Patent
Malik et al.

(10) Patent No.: US 9,602,868 B2
(45) Date of Patent: Mar. 21, 2017

(54) METHOD AND APPARATUS FOR CONTROLLING A MEDIA DEVICE

(71) Applicant: AT&T INTELLECTUAL PROPERTY I, L.P., Atlanta, GA (US)

(72) Inventors: Dale Malik, Atlanta, GA (US); David Brux Delorme, Stone Mountain, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 15/248,908

(22) Filed: Aug. 26, 2016

(65) Prior Publication Data
US 2016/0366467 A1 Dec. 15, 2016

Related U.S. Application Data

(63) Continuation of application No. 13/705,894, filed on Dec. 5, 2012, now Pat. No. 9,462,332.

(51) Int. Cl.
H04W 4/00 (2009.01)
H04N 21/4367 (2011.01)
(Continued)

(52) U.S. Cl.
CPC ..... H04N 21/4367 (2013.01); H04L 12/2809 (2013.01); H04N 21/26613 (2013.01);
(Continued)

(58) Field of Classification Search
CPC ..... H04W 12/06; H04W 12/04; H04W 80/04; H04W 48/16; H04W 4/008; H04W 60/00;
(Continued)

(56) References Cited

U.S. PATENT DOCUMENTS 5,689,559 A 11/1997 Park
5,761,421 A 6/1998 Van Hoff
(Continued)

OTHER PUBLICATIONS

B. Zimmerly, , ""A Tiny Cloud in Android—Exploring the Android File System from Your Browser",", pp. 1-17, http://www.ibm.com/developeworks/opensource/library/os-tinycloud/index.htm, website last visited Oct. 1, 2010.
(Continued)

Primary Examiner — Matthew Sams
Assistant Examiner — Gary Lafontant
(74) Attorney, Agent, or Firm — Guntin & Gust, PLC; Joseph Hrutka

(57) ABSTRACT

A system that incorporates the subject disclosure may include, for example, a method for detecting a communication network, broadcasting a query message by way of the communication network, receiving a response message from the communication network, detecting from the response message that a media device is communicatively coupled to the communication network, receiving a key from a remote server to enable communications with the media device, detecting an event requiring use of the media device, generating a command responsive to the event, transmitting to the media device the command to direct the media device to request information from a web server executed by the processor, receiving from the media device a request for information to be provided by the web server, and transmitting to the media device by way of the web server the information requested. Other embodiments are disclosed.

20 Claims, 5 Drawing Sheets

(51) Int. Cl.
| | |
|---|---|
| H04L 12/28 | (2006.01) |
| H04N 21/266 | (2011.01) |
| H04N 21/41 | (2011.01) |
| H04N 21/436 | (2011.01) |
| H04N 21/4363 | (2011.01) |
| H04N 21/472 | (2011.01) |

(52) U.S. Cl.
CPC ... *H04N 21/4126* (2013.01); *H04N 21/43615* (2013.01); *H04N 21/43637* (2013.01); *H04N 21/472* (2013.01)

(58) Field of Classification Search
CPC .... H04W 76/025; H04W 8/005; H04L 63/08; H04L 63/0853; H04L 2209/80; H04L 2463/062; H04L 63/0428; H04L 63/068
USPC .......................................... 455/411; 713/182
See application file for complete search history.

(56) References Cited

U.S. PATENT DOCUMENTS

| | | |
|---|---|---|
| 6,006,303 A | 12/1999 | Barnaby et al. |
| 6,167,513 A | 12/2000 | Inoue et al. |
| 6,463,153 B1 | 10/2002 | Sako et al. |
| 6,938,156 B2 | 8/2005 | Wheeler et al. |
| 7,016,951 B1 | 3/2006 | Longworth et al. |
| 7,127,619 B2 | 10/2006 | Unger et al. |
| 7,194,438 B2 | 3/2007 | Sovio et al. |
| 7,260,597 B1 | 8/2007 | Hofrichter et al. |
| 7,391,866 B2 | 6/2008 | Fukami et al. |
| 7,412,727 B2 | 8/2008 | Kim |
| 7,430,753 B2 | 9/2008 | Gray |
| 7,492,899 B2 | 2/2009 | Qiao |
| 7,590,703 B2 | 9/2009 | Cashman et al. |
| 7,634,076 B2 | 12/2009 | Lee et al. |
| 7,720,986 B2 | 5/2010 | Savoor |
| 7,756,130 B1 | 7/2010 | Lee |
| 7,761,531 B2 | 7/2010 | Johnson et al. |
| 8,015,253 B1 | 9/2011 | Zapata et al. |
| 8,108,916 B2 | 1/2012 | Fink et al. |
| 8,116,808 B2 | 2/2012 | Amine |
| 8,130,738 B2 | 3/2012 | Chan et al. |
| 8,169,958 B2 | 5/2012 | Torres et al. |
| 8,332,905 B2 | 12/2012 | Jenkin et al. |
| 8,392,947 B2 | 3/2013 | Grannan et al. |
| 8,396,475 B1 | 3/2013 | Bonner |
| 8,443,420 B2 | 5/2013 | Brown et al. |
| 8,989,055 B2 | 3/2015 | Simpson et al. |
| 2002/0143773 A1 | 10/2002 | Spicer et al. |
| 2002/0157002 A1 | 10/2002 | Messerges et al. |
| 2002/0184301 A1 | 12/2002 | Parent |
| 2003/0026423 A1 | 2/2003 | Unger et al. |
| 2003/0051041 A1 | 3/2003 | Kalavade et al. |
| 2003/0095664 A1 | 5/2003 | Asano et al. |
| 2003/0190024 A1 | 10/2003 | Ju |
| 2004/0133794 A1 | 7/2004 | Kocher et al. |
| 2004/0215746 A1 | 10/2004 | McCanne et al. |
| 2004/0240668 A1 | 12/2004 | Bonan et al. |
| 2004/0253923 A1 | 12/2004 | Braley |
| 2005/0010637 A1 | 1/2005 | Dempski et al. |
| 2005/0044223 A1 | 2/2005 | Meyerson |
| 2005/0125819 A1 | 6/2005 | Ono et al. |
| 2005/0138192 A1 | 6/2005 | Encarnacion et al. |
| 2005/0177515 A1 | 8/2005 | Kalavade et al. |
| 2005/0235329 A1 | 10/2005 | Karaoguz et al. |
| 2005/0251821 A1 | 11/2005 | Pina |
| 2006/0009247 A1 | 1/2006 | Kelley et al. |
| 2006/0031451 A1 | 2/2006 | Lortz et al. |
| 2006/0046714 A1 | 3/2006 | Kalavade |
| 2006/0098593 A1 | 5/2006 | Edvardsen et al. |
| 2006/0123099 A1 | 6/2006 | Paila |
| 2006/0150251 A1 | 7/2006 | Takashima et al. |
| 2006/0172700 A1 | 8/2006 | Wu |
| 2006/0193456 A1 | 8/2006 | Light et al. |
| 2006/0209773 A1 | 9/2006 | Hundal |
| 2006/0220838 A1 | 10/2006 | Wakim et al. |
| 2006/0262913 A1 | 11/2006 | Cook et al. |
| 2006/0271968 A1 | 11/2006 | Zellner |
| 2007/0005506 A1 | 1/2007 | Candelore et al. |
| 2007/0019670 A1 | 1/2007 | Falardeau |
| 2007/0022469 A1 | 1/2007 | Cooper |
| 2007/0055783 A1 | 3/2007 | Gourraud |
| 2007/0097860 A1 | 5/2007 | Rys |
| 2007/0130476 A1 | 6/2007 | Mohanty et al. |
| 2007/0140448 A1 | 6/2007 | Lin et al. |
| 2007/0142036 A1 | 6/2007 | Wikman et al. |
| 2007/0157281 A1 | 7/2007 | Ellis |
| 2007/0180082 A1 | 8/2007 | Abraham et al. |
| 2007/0180111 A1 | 8/2007 | Chmaytelli et al. |
| 2007/0263853 A1 | 11/2007 | Pearson et al. |
| 2007/0298842 A1 | 12/2007 | Kamada et al. |
| 2008/0074258 A1 | 3/2008 | Bennett et al. |
| 2008/0195406 A1 | 8/2008 | Matsumoto |
| 2008/0281926 A1 | 11/2008 | Walter et al. |
| 2008/0320534 A1 | 12/2008 | Wang et al. |
| 2009/0019492 A1 | 1/2009 | Grasset |
| 2009/0031360 A1 | 1/2009 | Kidd et al. |
| 2009/0063193 A1 | 3/2009 | Barton et al. |
| 2009/0088197 A1 | 4/2009 | Stewart |
| 2009/0089183 A1 | 4/2009 | Afram et al. |
| 2009/0093237 A1 | 4/2009 | Levenshteyn |
| 2009/0106366 A1 | 4/2009 | Virtanen et al. |
| 2009/0171985 A1 | 7/2009 | Tischer |
| 2009/0193486 A1 | 7/2009 | Patel et al. |
| 2009/0204617 A1 | 8/2009 | Benson et al. |
| 2009/0282098 A1 | 11/2009 | Karaoguz |
| 2009/0288122 A1 | 11/2009 | Zellner |
| 2009/0298514 A1 | 12/2009 | Ullah |
| 2009/0298535 A1 | 12/2009 | Klein et al. |
| 2009/0327702 A1 | 12/2009 | Schnell |
| 2009/0328118 A1 | 12/2009 | Ravishankar |
| 2009/0328228 A1 | 12/2009 | Schnell |
| 2010/0031298 A1 | 2/2010 | Iwanami et al. |
| 2010/0031366 A1 | 2/2010 | Knight et al. |
| 2010/0052853 A1 | 3/2010 | Hilton |
| 2010/0058398 A1 | 3/2010 | Ojala et al. |
| 2010/0071021 A1 | 3/2010 | Friedman |
| 2010/0076274 A1 | 3/2010 | Severson |
| 2010/0194335 A1 | 8/2010 | Kirby et al. |
| 2010/0197238 A1 | 8/2010 | Pathuri et al. |
| 2010/0275249 A1 | 10/2010 | McCann et al. |
| 2010/0328547 A1 | 12/2010 | Mayorga |
| 2011/0022522 A1 | 1/2011 | Sege |
| 2011/0043326 A1 | 2/2011 | Lee et al. |
| 2011/0055901 A1 | 3/2011 | Karaoguz et al. |
| 2011/0130118 A1 | 6/2011 | Fan |
| 2011/0131398 A1 | 6/2011 | Chaturvedi et al. |
| 2011/0197264 A1 | 8/2011 | McDade |
| 2011/0209221 A1 | 8/2011 | Hanson et al. |
| 2011/0258437 A1 | 10/2011 | McKelvey |
| 2012/0030034 A1 | 2/2012 | Knapp et al. |
| 2012/0036549 A1 | 2/2012 | Patel et al. |
| 2012/0062796 A1 | 3/2012 | Roberts et al. |
| 2012/0081209 A1 | 4/2012 | Brown et al. |
| 2012/0084834 A1 | 4/2012 | Brown |
| 2012/0246214 A1 | 9/2012 | Ogawa et al. |
| 2013/0031261 A1 | 1/2013 | Suggs et al. |
| 2013/0254353 A1 | 9/2013 | Liu et al. |
| 2014/0298418 A9 | 10/2014 | Cronk et al. |
| 2016/0212739 A1 | 7/2016 | Brown et al. |

OTHER PUBLICATIONS

Davies, C. , ""i-Jetty Turns Android Cellphone Into Mobile Webserver",", pp. 1-6, http://www.phonemag.com/i-jetty-turnsandroid-cellphone-into-mobile-webserver-031762 . . . , posted Mar. 17, 2008, website last visited Oct. 1, 2010.

Davies, C. , "i-Jetty Turns Android Cellphone Into Mobile Webserver", 6 pages, http://www.phonemag.com/i-jetty-turns-android-cellphone-into-mobile-webserver-031762 . . . , posted Mar. 17, 2008, website last visited Oct. 1, 2010.

(56) References Cited

OTHER PUBLICATIONS

Lin, et al., ""On Controlling Digital TV Set-Top-Box by Mobile Devices via IP Network",", pp. 1-8, Proceedings of the Seventh IEEE International Symposium on Multimedia (ISM '05), Computer Society, 2005.

Lin, et al., "On Controlling Digital TV Set-Top-Box by Mobile Devices via IP Network", 8 pages, Proceedings of the Seventh IEEE International Symposium on Multimedia (ISM '05), Computer Society, 2005.

Linux, Devices , ""iNTEL 'Personal Server' Research: Mobile Computing in the Palm of your Hand",", pp. 1-4, http://www.linuxfordevices.com/c/a/Linux-For-Devices-Articles/Intel-Personal-Server-res . . . , website last visited Oct. 1, 2010.

Linux Devices, , "Intel 'Personal Server' Research: Mobile Computing in the Palm of your Hand", pp. 1-4, http://www.linuxfordevices.com/c/a/Linux-For-Devices-Articles/Intel-Personal-Server-res . . . , website last visited Oct. 1, 2010.

Opensource, , ""MWS:Rationale—A Website on a Mobile Personal Device is Different",", pp. 1-4, http://wiki.opensource.nokia.com/projects/MWS:Rationale, website last visited Oct. 1, 2010.

Opensource, , "MWS: Rationale—A Website on a Mobile Computing in the Palm of your Hand", pp. 1-4, http://wiki.opensource.nokia.com/projects/MWS:Rationale, website last visited Oct. 1, 2010.

Rendon, et al., "Architecture for Web Services Access from Mobile Devices", Web Congress, LA-WEB 2005, Third Latin American, 2005.

Soroko, , ""Web Server on Your Cellphone—A New Design Space",", Popular Logistics, Feb. 16, 2010, 4 pages.

Soroko, Jonathan , "Web Server on Your Cellphone—a New Design Space", pp. 1-4, Popular Logistics, Feb. 16, 2010.

Toorani, et al., ""LPKI—A Lightweight Public Key Infrastructure for the Mobile Environments"", pp. 162-166, IEEE 2008, ICCS 2008.

Toorani, et al., "LPKI—A Lightweight Public Key Infrastructure for the Mobile Environments", pp. 162-166, IEEE 2008, ICCS 2008.

Wikipedia, , ""Mobile Web Server (Symbian OS)",", 1 page, http://en.wikipedia.org/wiki/Mobile_Web_Server_(Symbian_OS), website last visited Oct. 1, 2010.

Wikipedia, , ""Mobile Web Server",", pp. 1-3, Page last modified Sep. 11, 2010.

Wikipedia, , "Mobile Web Server", pp. 1-3, website last visited Oct. 1, 2010.

Wikipedia, "Mobile Web Server (Symbian OS)", 1 page, http://en.wikipedia.org/wiki/Mobile_Web_Server_(Symbian_Os), website last visited Oct. 1, 2010.

Zimmerly, Bill , "A Tiny Cloud in Android", 17 pages article, website last visited Oct. 1, 2010, http://www.ibm.com/developerworks/opensources/library/os-tinycloud/index.html.

100

200

400

METHOD AND APPARATUS FOR CONTROLLING A MEDIA DEVICE

CROSS-REFERENCE TO RELATED APPLICATIONS

This application is a continuation of and claims priority to U.S. patent application Ser. No. 13/705,894, filed Dec. 5, 2012, now U.S. Patent Publication No. 2014/0155030. The contents of the foregoing is hereby incorporated by reference into this application as if set forth herein in full.

FIELD OF THE DISCLOSURE

The subject disclosure relates to a method and apparatus for controlling a media device.

BACKGROUND

Media communication systems such as interactive television systems can deliver media content to media processors such as set-top boxes. Generally, media content can be broadcast by these systems and delivered according to the type of services users have subscribed to. In interactive media communication systems, users can also request services on demand. Portable media devices such as mobile phones or media players can be adapted to communicate with media processors over a wireless medium. The combined services of portable and fixed media devices can provide users a rich environment for utilizing multimedia services.

BRIEF DESCRIPTION OF THE DRAWINGS

Reference will now be made to the accompanying drawings, which are not necessarily drawn to scale, and wherein.

DETAILED DESCRIPTION

Figure 1:
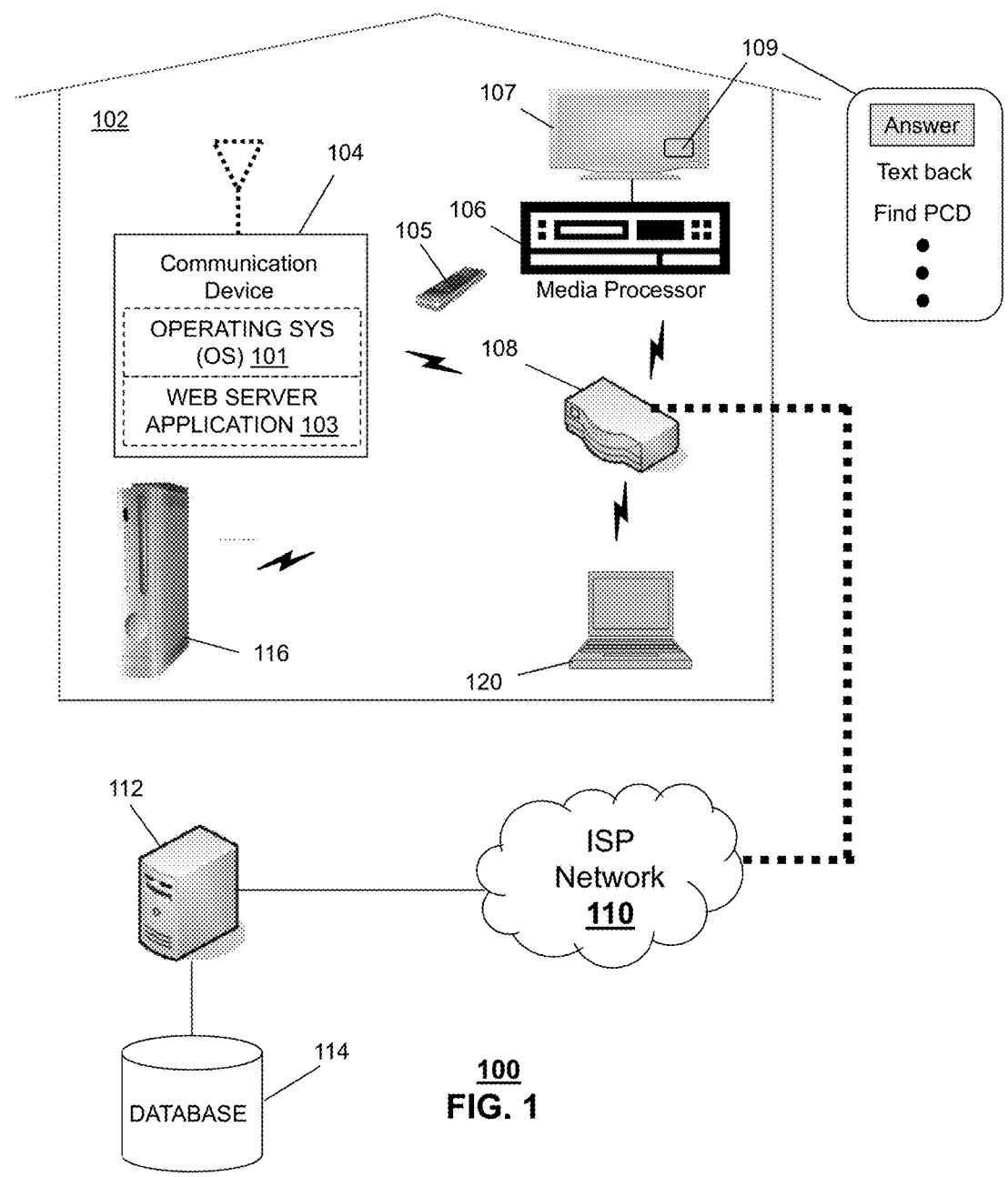
FIG. 1 depicts an illustrative embodiment of a system.

The subject disclosure describes, among other things, illustrative embodiments for controlling a media center by way of a portable communication device executing a web server executed by the portable communication device. Other embodiments are included in the subject disclosure.

One embodiment of the subject disclosure includes a portable communication device comprising a memory to store instructions, and a processor coupled to the memory. Upon execution of the instructions the processor can perform operations comprising detecting a wireless network, transmitting a query message to the wireless network to identify devices communicatively coupled to the wireless network, receiving a response message by way of the wireless network, and detecting according to the response message that a media device is communicatively coupled to the wireless network. The operations can further include submitting to a remote server a request for a key to enable communications with the media device, receiving the key from the remote server, monitoring an event associated with use of the media device, and detecting the event. The operations can also include generating a command according to the key, transmitting to the media device the command, where the command directs the media device to request web page information from a web server executed by the processor, receiving a request for web page information from the media device responsive to transmitting the command, and transmitting the web page information to the media device by way of the web server responsive to receiving the request.

One embodiment of the subject disclosure includes a method for transmitting a query message to identify devices communicatively coupled to a communication network, receiving a response message by way of the communication network, and detecting according to the response message that a media device is communicatively coupled to the communication network. The method can also include submitting to a remote server a request for a key to enable communications with the media device, receiving the key from the remote server, and detecting an event associated with use of the media device, generating a command responsive to detecting the event. The method can further include transmitting to the media device the command, where the command directs the media device to request web page information from a web server, receiving a request for the web page information from the media device, and transmitting the web page information to the media device by way of the web server.

One embodiment of the subject disclosure includes a computer-readable storage device, comprising computer instructions. A processor that executes the instructions can perform operations including detecting a communication network, broadcasting a query message by way of the communication network, receiving a response message from the communication network, and detecting from the response message that a media device is communicatively coupled to the communication network. The operations can also include receiving a key from a remote server to enable communications with the media device, detecting an event requiring use of the media device, generating a command responsive to the event, transmitting to the media device the command to direct the media device to request information from a web server executed by the processor, receiving from the media device a request for information to be provided by the web server, and transmitting to the media device by way of the web server the information requested.

FIG. 1 depicts an illustrative embodiment of a system 100. The system 100 can comprise a gateway 108 such as a VDSL modem and combined wireless router situated in premises 102 for providing wireless communication services to devices in the premises 102. The gateway 108 can provide services to a media processor 106 such as a set-top box, digital video recorder or other devices that can process audio content, video content, or audio-video content and present such content by way of a media presentation device such as an audio presentation device in the form of a speaker system or a visual presentation device such as display device 107. The gateway 108 can also provide wireless communication services to a computer 120, a gaming console 116, and a portable communication device 104. The gateway 108 can facilitate communications between devices in the premises 102, and with devices outside of the premises 102 by way of an internet service provider 110. Devices in the premises 102 can, for example, access a server 112 coupled to a database 114.

Figure 2:
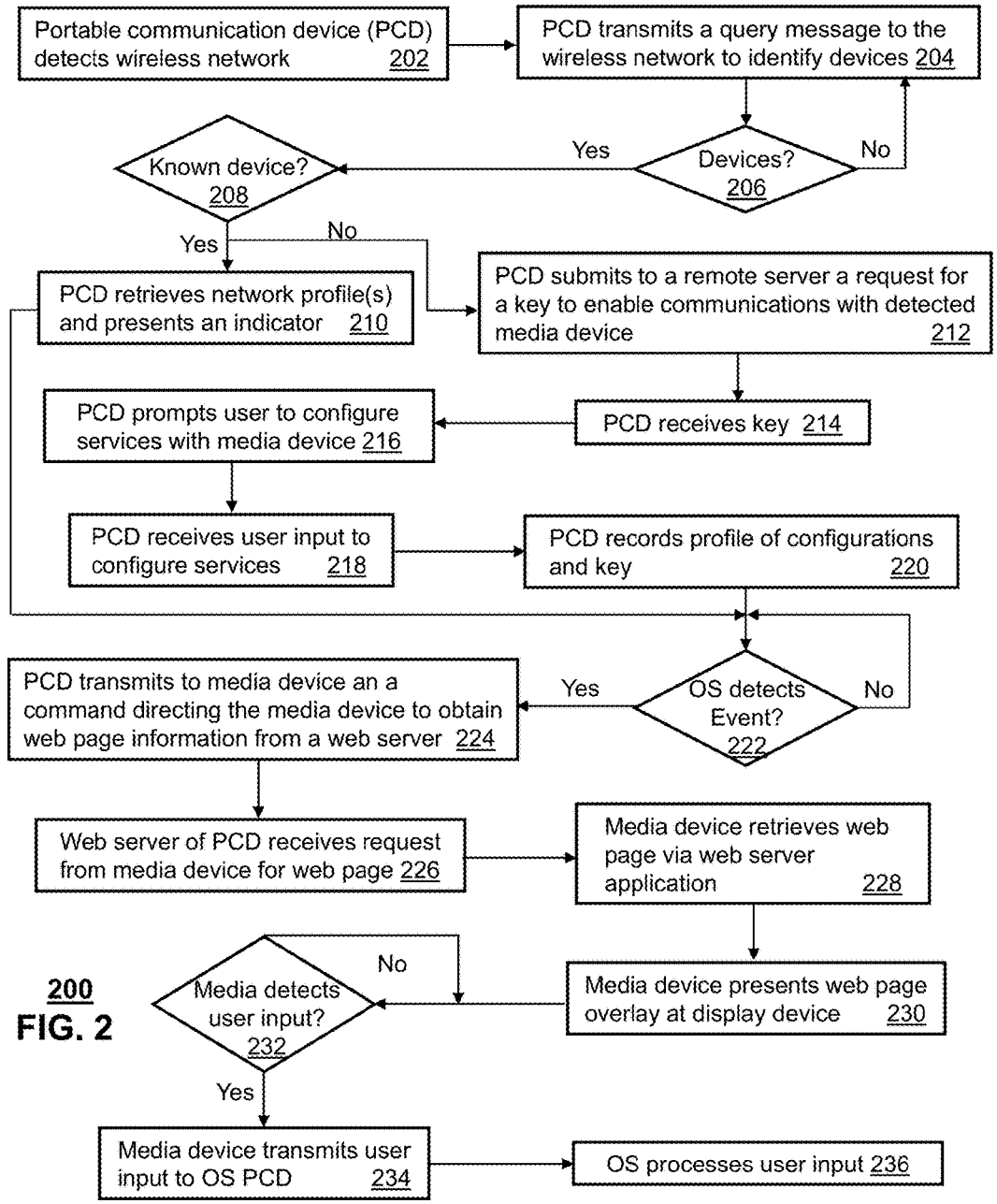
FIG. 2 depicts an illustrative embodiment of a method used in portions of the system of FIG. 1.

FIG. 2 depicts an illustrative embodiment of a method 200 used in portions of the system 100 of FIG. 1. Method 200 can begin with step 202 where an operating system 101 of a portable communication device 104 such as shown in FIG. 1 detects a wireless network operated by the gateway 108. At step 204, the operating system 101 of the portable communication device 104 causes a transmission of a query message, which is carried by the wireless network to identify devices communicatively coupled to the wireless network. The query message can be formatted according to a simple service discovery protocol. In step 206, the operating system 101 of the portable communication device 104 can determine if any devices communicatively coupled to the wireless network have responded. If a response message is received, the operating system 101 of the portable communication device 104 can determine at step 208 whether the responding device is known to the portable communication device 104. If the operating system 101 of the portable communication device 104 does not recognize the responding device, but recognizes from the response message that the responding device is a media device (such as a set top box, gaming console, a digital video recorder, etc.), then the operating system 101 of the portable communication device 104 proceeds to step 212 where it causes the portable communication device 104 to submit to a remote server 112 such as shown in FIG. 1 a request for a key to enable communications with the detected media device. The key can be a key for encrypting information exchanged with a media device, for authenticating the portable communication device 104 at the media device, or a combination thereof.

The request sent by the portable communication device 104 to the remote server 112 can include an identity of the media device such as, for example, a serial number, a media access control address, a globally unique identifier, or some other identifier of the media device that is recognizable to the server 112. The server 112 can utilize the identifier of the media device to index through the database 114 to retrieve a key associated with the media device if the identifier is recognized. The request sent by the portable communication device 104 can also include authentication information to verify that the portable communication device 104 is authorized to request a key for communicating with the media device. The server 112 can use the authentication information to retrieve subscriber account information from database 114 to identify which services the portable communication device 104 is authorized to use, and thereby determine whether the portable communication device 104 is authorized to communicate with the media device and utilize its resources.

Once the server 112 has authorized the portable communication device 104 and has found a key associated with the media device based on the supplied identity of the media device, the server 112 transmits the key to the portable communication device 104 over a secure channel using for example secure socket layer (SSL) encryption, which the portable communication device 104 receives in step 214. With the key, the operating system 101 of the portable communication device 104 can now engage in communications with the media device.

Figure 3:
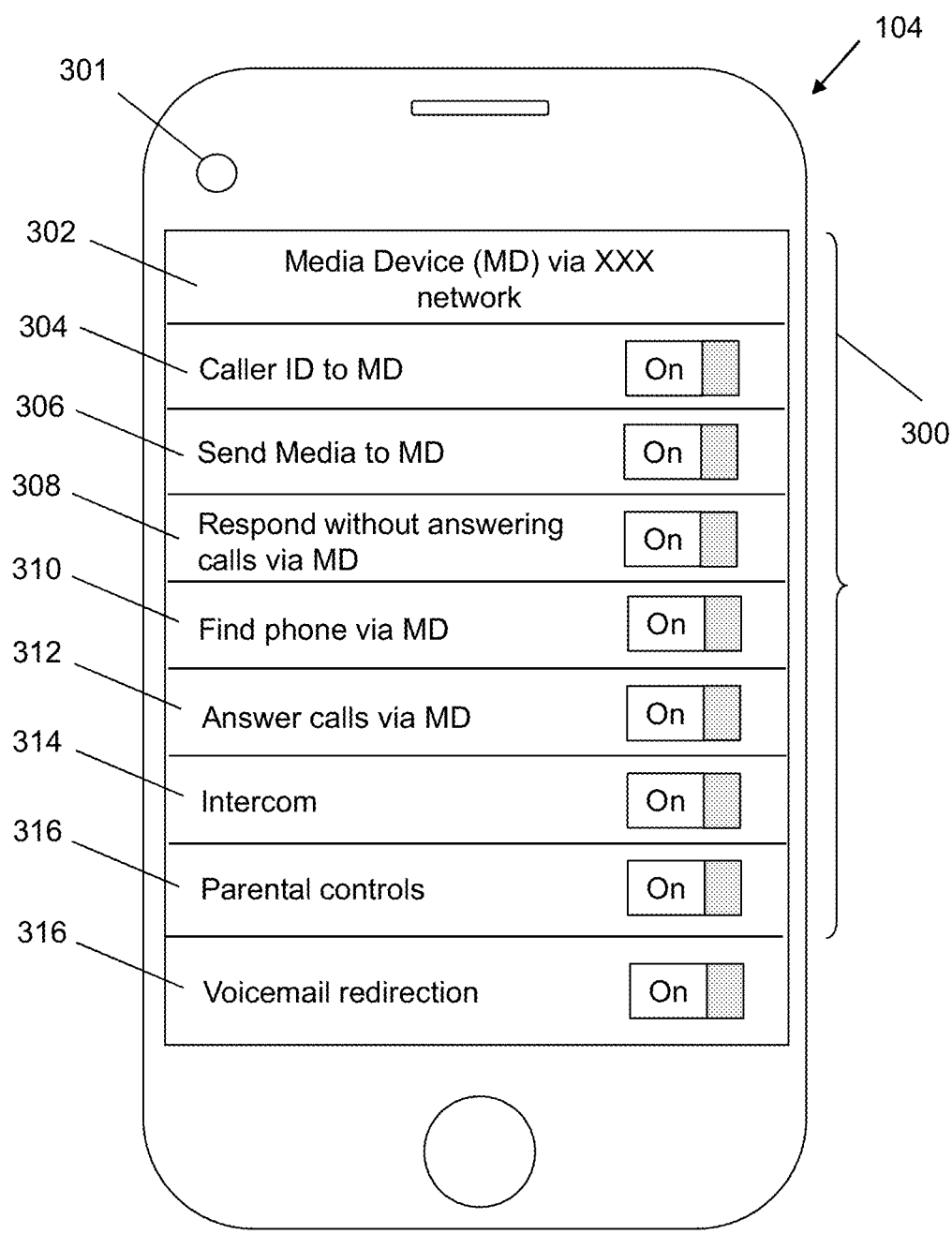
FIG. 3 depicts an illustrative embodiment of a graphical user interface presented by a communication device of the system of FIG. 1.

At step 216 the operating system 101 of the portable communication device 104 can prompt a user to configure services with the newly detected media device. FIG. 3 depicts an illustrative embodiment of a graphical user interface (GUI) presented by a display of the portable communication device 104, which can serve as a prompt for user input. In this illustration, the portable communication device 104 presents a GUI depicting a first section 302, which indicates that the portable communication device 104 has detected the media device via the wireless network serviced by the gateway 108. The network can be identified by the service set identification (SSID) used by the network, or some other useful identifier to assist a user to identify the network.

For a media device such as a set top box, the portable communication device 104 can present a number of services which can be enabled by a user with a slideable On/Off switch for interacting with the media device. For example, in section 304, a user can enable a caller ID feature between the portable communication device 104 and the media device by sliding the On/Off switch to the on position. The caller ID feature can be used during call processing. For example, when the operating system 101 of the portable communication device 104 detects an incoming call, and is aware that the media device is accessible and that the caller ID feature is enabled, the portable communication device 104 can submit to the media device a command including the key as will be described in steps 224-230 in order to cause the media device to present the caller ID of the caller at a presentation device such as display device 107 of FIG. 1.

Referring back to FIG. 3, in section 306, the user can also enable a media exchange feature for sending media content from the portable communication device 104 to the media device for presentation at the display device 107 and/or an audio system. The user can enable this feature by sliding an On/Off switch to the on position by way of a touch-screen display. Media content can represent audio content, video content, still image content, audio-video content, or derivatives thereof. In section 308, the user can also enable a call response message feature in which the portable communication device 104 can direct the media device to present selectable responses in section 109 of the presentation device 107 during an incoming call. Selectable responses can include, for example, an option to respond to the incoming call with text messages such as SMS messages, canned voice responses, or other suitable response options. Each option can be selected by a remote control device 105 that provides wireless signals such as infrared signals to the media device for indicating a selected response.

In section 310, the user can also enable finding the portable communication device 104 in the event the user cannot readily find the portable communication device 104. This option can be presented in section 109 of the presentation device 107. When this feature is selected with the remote control device 105, the media device can direct the portable communication device 104 to generate audible alerts to assist the user in locating the portable communication device 104. In section 310, the user can further enable answering calls at the portable communication device 104. This option is also shown in section 109 of the presentation device 107, which is selectable with the remote control device 105.

In section 314, the user can also enable an intercom feature. This feature allows the portable communication device 104 to broadcast a user's voice to more than one media device detected by the portable communication device 104, or selectively at a media device specified by the user (e.g., at a set-top box in a child's room). In section 314, the user can also enable parental control features. This feature allows the portable communication device 104 to control media content presented by the media device on a per user basis. For example, parental controls can establish for a particular user of the media device time limits for use of the media device, limit media content presentations to specific ratings (e.g., G rated content only), limit media content to specific shows, and so on. In section 316, the user can enable a voicemail redirection feature. For example, when an incoming call is detected, GUI section 109 of the display device 107 of FIG. 1 can also include an option (not shown) to allow the user by way of the remote control device 105 to redirect a call to voicemail immediately rather than wait until a communication system processing the call on its own redirects the call to voicemail.

The selectable features shown in the GUI of FIG. 3 are illustrative features which enable a user to configure each media device detected in the wireless network of FIG. 1. GUI's with other features can be used to configure, for example, the gaming console 116, the computer 120, as well as other programmable appliances not shown in the system 100 of FIG. 1.

Referring back to FIG. 2, once a user has provided the operating system 101 of the portable communication device 104 user input in step 218 to configure the detected media device, the operating system 101 of the portable communication device 104 can proceed to step 220 where it records the selected configurations in a profile along with a copy of the key provided by the server 112 to enable communications between the portable communication device 104 and the detected media device. Each time a new media device is detected by the operating system 101 of the portable communication device 104 in the wireless network, all or a portion of the foregoing steps 202-220 can be executed and feature configurations received in step 218 can be recorded in a corresponding profile for the newly detected media device.

As a result of these embodiments, the next time the portable communication device 104 enters a communication range of the wireless network, the operating system 101 of the portable communication device 104 can recognize known devices in step 208, and proceed to step 210 where it retrieves a profile for each media device detected in the network. In addition to retrieving a profile for each media device, the operating system 101 of the portable communication device 104 can present an indicator 301 as shown in FIG. 3 to notify the user that the user has entered a recognized network with recognized media devices. The indicator can be an iconic symbol with a letter or other descriptor that assists a user in identifying the type of services discovered by the operating system 101 of the portable communication device 104 upon entering any premises with media devices. It is noted that if a new media device has been added to the wireless network that is not recognized by the operating system 101 of the portable communication device 104, the operating system 101 of the portable communication device 104 will request from the server 112 a new key, and a new configuration GUI 300 will be presented with selectable features specific to the newly detected media device for configuring functions of the new media device.

Once all media devices have been discovered and configured by way of steps 202 through 220, the operating system 101 of the portable communication device 104 can proceed to step 222 where it monitors user initiated events or events initiated without user intervention. The operating system 101 can perform many functions, among them, call processing, user input processing, event management processing, and so on. A user-initiated event can be an event caused by user input provided to the portable communication device 104 by way of a user interface such as a keyboard or touch screen. A user initiated event can prompt, for example, an intercom session responsive to user input received by the portable communication device 104. The user input can be generated as a result of the user selecting an icon presented by a display of the portable communication device 104, which when selected invokes the intercom feature. A user-initiated event can also be invoked by way of the media device. For example, the remote control device 105 can be configured with custom buttons to initiate functions of the portable communication device 104. For instance, a user may request sending a text message to a targeted device.

An incoming call can be an instance of an event detected by the operating system 101 of the portable communication device 104 without user intervention. Similarly, an incoming text message can be an event detected by the operating system 101 of the portable communication device 104 without user intervention. Other similar events not involving user intervention can be monitored by the operating system 101 of the portable communication device 104 in step 222.

When an event is detected in step 222 by the operating system 101, the portable communication device 104 can proceed to step 224 where the operating system 101 generates a command responsive to the event, which it conveys to the media device. The command generated by the operating system 101 can, for example, include a uniform resource locator (URL) for selecting one of several web pages managed by a web server application 103 executed by the portable communication device 104. The web page can be preconfigured by the operating system 101 to include information associated with the detected incoming call, such as the caller ID. The operating system 101 can encrypt the command with the key of the media device for which the event is directed, and cause the portable communication device 104 to transmit the encrypted command to the media device to direct the media device to request the web page from the web server application 103 according to the URL generated by the operating system 101. Alternatively, the operating system 101 can transmit a command with the URL without encryption and provide the key in the transmitted command with the URL for authentication purposes. Upon receiving the encrypted (or unencrypted) command, the media device processes the command and determines from the command that it must retrieve the web page from the web server 103 according to the URL provided by the operating system 101. In one embodiment, the web page request generated by the media device can be encrypted with the key of the media device to maintain communications secure. In another embodiment, the URL request can be unencrypted.

Once the web server 103 of the portable communication device 104 receives the web page requested by the media device according to the URL in step 226, it retrieves the web page information and provides it to the media device. As noted earlier, the operating system 101 can configure the web page with the caller ID of the incoming call. The web page can present the caller ID along with selectable response options that are presented by the media device by way of the GUI 109. In step 228, the web server application 103 causes the portable communication device 104 to transmit the web page to the media device according to the URL provided by the media device.

To better understand what may be presented by way of GUI 109, suppose that the caller ID feature, the call response message feature, and the find phone feature are enabled by way of the GUI 300 shown in FIG. 3. Once the event manager of the operating system 101 detects in step 222 the incoming call, the operating system 101 causes the portable communication device 104 to submit the command with embedded URL in step 224 to the media device, which in turn causes the media device to request from the web server application 103 the web page identified by the URL. The web page can be formatted according to a hypertext markup language (HTML). By formatting the web page in HTML the media device is provided sufficient information for presenting GUI 109 at the presentation device 107 as shown in FIG. 1. The HTML data, for example, can include dimensions of the GUI window 109 that is to be superimposed on a presentation area of the presentation device 107, coordinates of the window in the available presentation area of the presentation device 107, font colors, selectable hypertext to enable optional selection of responses, which can be acted on by the user during the incoming call using the remote control device 105, and so on.

Once the media device processes the HTML data and thereby presents GUI 109 at the presentation device 107, the media device can monitor at step 232 user input generated by the remote control device 105. For instance, upon a presentation of the caller ID via GUI 109, the user can choose to select via the remote control device 105 the "answer" option in GUI 109. The user can initiate this action by navigating in GUI 109 with up and down arrows and depressing an OK button of the remote control device 105 to select a desirable option. Once the media device detects user input at step 232, the media device can proceed to step 234 where it transmits the user input to the web server application 103 which in turn sends an event to the operating system 101 of the portable communication device 104. At step 236, the operating system 101 detects the selection of the answer call option. The operating system 101 then asserts the ring tone of the portable communication device 104 so that the user can locate the portable communication device 104 and thereby answer the incoming call.

Other functions can be executed by the operating system 101 of the portable communication device 104 when detecting events for sending media content (e.g., still pictures or video) to the media device for presentation at the presentation device 107, finding the portable communication device 104 by causing an assertion of the ring tone of the portable communication device 104, initiating the intercom feature in broadcast mode or specific to one of several media devices known to the portable communication device 104, and so on. The web server application 103 can be preloaded with a plurality web page templates that can be configured by the operating system 101 each time it detects and event. Once a web page is configured by the operating system 101, the operating system 101 can convey a URL to the media device as previously described above to enable the media device to present the web page at the presentation device 107 as GUI 109 with selectable options.

The aforementioned embodiments provide advantages for portable communication devices to detect media devices, to interact with media devices in a secure manner, and to present users automatic detection of media devices and options to configure such media devices with less effort than is required today. The above embodiments also enable service providers of media devices to control which portable communication devices are authorized to control the media devices by limiting the distribution of keys only to portable communication devices known to the service provider. Such knowledge can be based on the service provider offering media device services as well as portable communication device services in combination, which enables the service provider control access to both devices. Alternatively, the service provider can offer media device services, and broker agreements with distributors of portable communication devices that provide the service provider information to track portable communication devices authorized to use the media devices of the service provider. Other suitable arrangements can be used for implementing method 200 of FIG. 2.

It should be noted that the web server application 103 referred to above can represent a hypertext transfer protocol (HTTP) web server application implemented in software, hardware or combinations thereof executed by a processor of the portable communication device 104. Other types of web server applications that can be used by the portable communication device 104.

Figure 4:
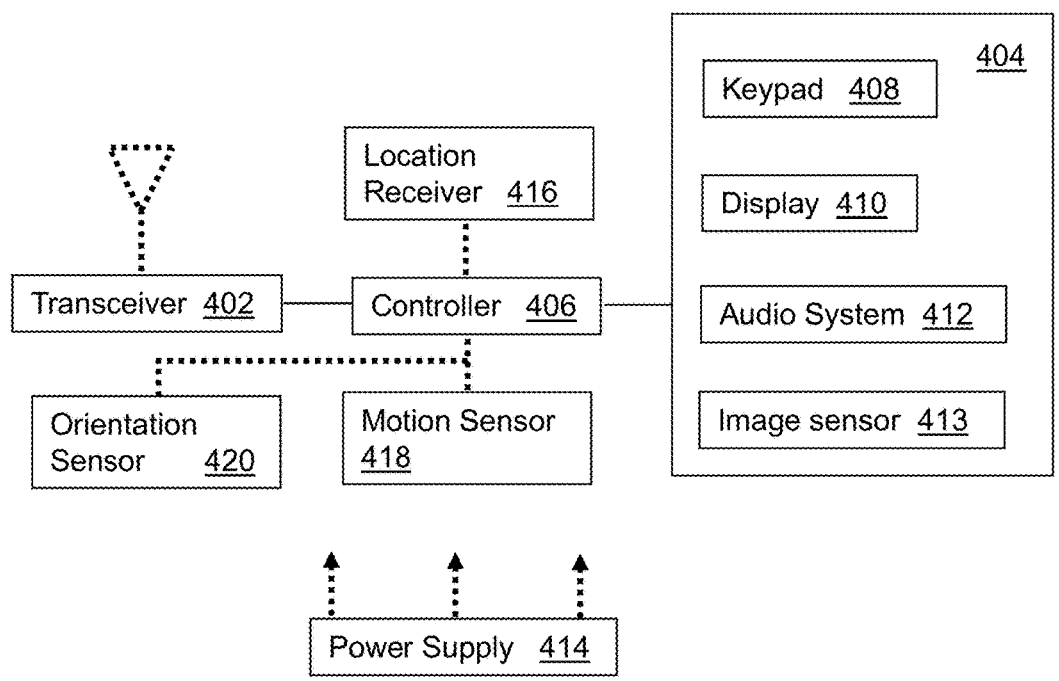
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIG. 1. The portable communication device 104 of FIG. 1 can be represented by communication device 400 of FIG. 4. Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

It will be appreciated that the communication device 400 can also represent other devices that can operate in communication system 100 of FIG. 1 such as the gaming console 116 and the media processor 106.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
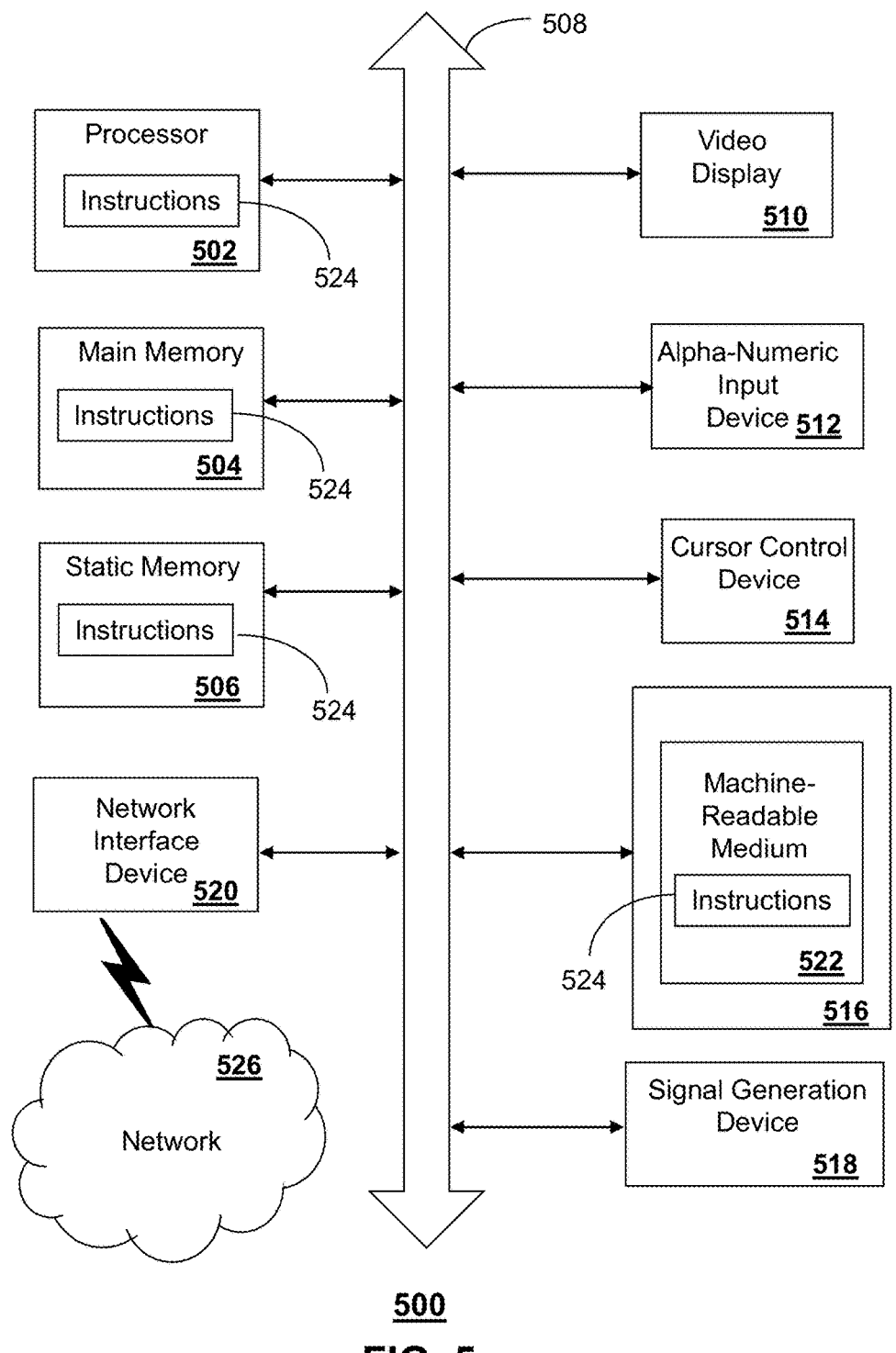
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the server 112, or the portable communication device 104 of FIG. 1 and other devices described herein. In some embodiments, the machine may be connected (e.g., using a network 526) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A device, comprising:
a processing system including a processor; and
a memory that stores executable instructions that, when executed by the processing system, facilitate performance of operations, comprising:
   detecting a wireless network;
   transmitting a query message to the wireless network to identify devices communicatively coupled to the wireless network;
   receiving a response message by way of the wireless network;

detecting, according to the response message, that a media device is communicatively coupled to the wireless network;
contacting a remote server through the wireless network;
retrieving profile information for the media device from the remote server associated with the wireless network, wherein a key for communicating with the media device is retrieved from the remote server when the remote server recognizes the media device;
obtaining configuration information for the media device based on the profile information by presenting a menu at the device to select the configuration information, wherein the configuration information determines an operative association between the media device and the device including responses to an event associated with use of the media device, wherein the event comprises an incoming communication to the device;
monitoring for the event associated with the use of the media device;
detecting the event;
determining that the configuration information for the media device includes directing event information to be presented at the media device;
responsive to detecting the event and to determining that the event information is to be presented at the media device:
transmitting, to the media device, a command that is generated according to the key for communicating with the media device, wherein the command directs the media device to request web page information related to the event from a web server executed by the processor of the device, and wherein the web page information includes information associated with the event, wherein the command includes a uniform resource locator for the media device to access a web page on the web server, wherein the web page information includes a graphical user interface for presentation by the media device, wherein the web page is executed by the web server, and wherein the web page is generated to include information associated with the event;
receiving a request for the web page information from the media device responsive to transmitting the command;
transmitting the web page information to the media device by way of the web server responsive to receiving the request, wherein the web page information directs the media device to present the information associated with the event and to present the graphical user interface;
receiving, from the media device, user generated input via the graphical user interface, wherein the response comprises a selection of an action to be performed in response to the event;
performing the action in response to the event, wherein the event includes presentation of a caller identification corresponding to the incoming communications at the media device;
submitting to a remote server a request for the key to enable communications with the media device; and
receiving the key from the remote server,
wherein the key enables the media device to authenticate the device, and
wherein the transmitting of the web page information to the media device enables answering of the incoming communications via the media device.

2. The device of claim 1, wherein the web page information is formatted according to an extensible markup language.

3. The device of claim 1, wherein the operations further comprise presenting an indicator on a display of the device responsive to detecting the media device.

4. The device of claim 1, wherein the incoming communications comprise a text message.

5. The device of claim 1, comprising presenting a prompt for configuring a communication feature associated with the media device through the device.

6. The device of claim 5, wherein the device comprises a portable communication device, and
wherein the communication feature comprises one of a caller identification feature, a media exchange feature, a call response message feature, a voicemail feature, an intercom feature, a parental control feature, a portable communication device location feature, or combinations thereof.

7. The device of claim 1, wherein the incoming communications comprise an incoming voice call.

8. The device of claim 1, wherein the web server comprises a hypertext transfer protocol web server application.

9. The device of claim 1, wherein the key is used to encrypt the command transmitted to the media device.

10. The device of claim 1, wherein the event further comprises one of an activity detected by the processor of the device or by a signal received by the media device from a remote controller causing the media device to transmit a message to the device descriptive of the signal generated by the remote controller.

11. The device of claim 10, wherein the activity detected by the processor further comprises user input detected by the processor.

12. The device of claim 1, wherein the media device comprise a set-top box.

13. The device of claim 1, wherein the operations further comprise:
detecting that the media device has not been previously detected; and
storing a record that includes the key, wherein the record is associated with the wireless network with the media device.

14. The device of claim 13, wherein the operations further comprise retrieving the key from the record without contacting the remote server responsive to a subsequent detection of one of the wireless network or the media device.

15. The device of claim 1, wherein the operations further comprise:
receiving a second response message by way of the wireless network;
detecting according to the second response message that a second media device is communicatively coupled to the wireless network;
submitting to the remote server a second request for a second key to enable communications with the second media device; and
receiving from the remote server the second key.

16. A method, comprising:
transmitting, by a processing system comprising a processor, a query message to identify devices communicatively coupled to a communication network;
receiving, by the processing system, a response message by way of the communication network;

detecting, by the processing system, according to the response message, that a media device is communicatively coupled to the communication network;

retrieving, by the processing system, a profile for the media device;

submitting, by the processing system, to a remote server a request for a key to enable communications with the media device;

receiving, by the processing system, the key from the remote server when the remote server recognizes the media device, wherein the key for communicating with the media device is retrieved from the remote server;

obtaining, by the processing system, configuration information for the media device based on the profile, wherein the configuration information determines responses to an event associated with use of the media device, wherein the event comprises an incoming communication to the processing system;

monitoring, by the processing system, for the event associated with use of the media device;

detecting, by the processing system, the event;

determining, by the processing system, that the configuration information for the media device includes directing event information to be presented at the media device;

responsive to detecting the event and to determining that event information is to be presented at the media device:
  transmitting, by the processing system, to the media device, a command that is generated according to the key for communicating with the media device, wherein the command directs the media device to request web page information related to the event from a web server executed by the processing system, and wherein the web page information includes information associated with the event, wherein the command includes a uniform resource locator for the media device to access a web page including the web page information on the web server, wherein the web page includes a graphical user interface for presentation by the media device;
  receiving, by the processing system, a request for the web page information from the media device responsive to transmitting the command;
  transmitting, by the processing system, the web page information to the media device by way of the web server responsive to receiving the request, wherein the web page information directs the media device to present the information associated with the event and to present the graphical user interface; and
  receiving, by the processing system, from the media device, user generated input via the graphical user interface, wherein the response comprises a selection of an action to be performed in response to the event;

receiving a second response message by way of the communication network;

detecting according to the second response message that a second media device is communicatively coupled to the communication network;

submitting to the remote server a second request for a second key to enable communications with the second media device; and receiving from the remote server the second key, wherein the key is used to encrypt the command transmitted to the media device.

17. The method of claim 16, wherein the graphical user interface is configured to receive an input from the media device and transmit the input to the communications network.

18. The method of claim 16, wherein the incoming communications comprise one of a voice mail or an incoming phone call via the communications network.

19. A non-transitory, machine-readable storage-medium, comprising executable instructions that, when executed by a processing system including a processor, facilitate performance of operations, comprising:

detecting a communication network;

broadcasting a query message by way of the communication network;
  receiving a response message from the communication network;
  detecting from the response message that a media device is communicatively coupled to the communication network, wherein the response includes profile information for the media device;
  contacting a remote server through the communication network to present a request to the remote server, wherein the request includes an identity of the media device associated with the request;
  receiving a key from the remote server to enable communications with the media device when the remote server recognizes the identity of the media device;
  obtaining configuration information for the media device, wherein the configuration information determines responses to an incoming communication to the processing system associated with use of the media device, wherein the incoming communication is sourced from a programmable appliance;
  detecting the incoming communication to the communication network;

generating a command responsive to the incoming communication according to the configuration information, wherein the command includes a uniform resource locator for the media device to access a web page, wherein the web page includes a graphical user interface for presentation by the media device, wherein the web page is executed by a web server of the processing system, and wherein the web page is generated to include information associated with the incoming communication;
  transmitting, to the media device, the command to direct the media device to request information from the web server, wherein the information describes the incoming communication, wherein the information directs the media device to present the information associated with the incoming communication via the graphical user interface;

receiving, from the media device, a request for information to be provided by the web server; and
  transmitting to the media device, by way of the web server, the information requested;
  receiving a second response message by way of a wireless network;
  detecting according to the second response message that a second media device is communicatively coupled to the wireless network;
  submitting to the remote server a second request for a second key to enable communications with the second media device; and
  receiving from the remote server the second key, wherein the web page is formatted according to an extensible markup language.

20. The non-transitory, machine-readable storage medium of claim 19, wherein the appliance and the media device are located a same premises.

\* \* \* \* \*